United States Patent
Seo et al.

(10) Patent No.: US 11,167,525 B2
(45) Date of Patent: *Nov. 9, 2021

(54) COSMETIC PACK AND MANUFACTURING METHOD THEREFOR

(71) Applicant: AMOLIFESCIENCE CO., LTD., Seoul (KR)

(72) Inventors: In Yong Seo, Seoul (KR); Ji Hyun Lee, Incheon (KR)

(73) Assignee: AMOLIFESCIENCE CO., LTD., Seoul (KR)

( * ) Notice: Subject to any disclaimer, the term of this patent is extended or adjusted under 35 U.S.C. 154(b) by 243 days.

This patent is subject to a terminal disclaimer.

(21) Appl. No.: 15/901,319

(22) Filed: Feb. 21, 2018

(65) Prior Publication Data

US 2018/0186117 A1 Jul. 5, 2018

Related U.S. Application Data

(63) Continuation-in-part of application No. PCT/KR2016/009076, filed on Aug. 18, 2016.

(30) Foreign Application Priority Data

Aug. 24, 2015 (KR) .................. 10-2015-0118865

(51) Int. Cl.
*B32B 5/02* (2006.01)
*B32B 7/06* (2019.01)
(Continued)

(52) U.S. Cl.
CPC .............. *B32B 5/022* (2013.01); *A45D 40/26* (2013.01); *A45D 44/002* (2013.01); *B29C 65/56* (2013.01); *B29C 66/45* (2013.01); *B29C 66/712* (2013.01); *B29C 66/7294* (2013.01); *B29D 99/005* (2013.01); *B32B 5/26* (2013.01); *B32B 7/06* (2013.01); *B32B 27/12* (2013.01);
(Continued)

(58) Field of Classification Search
CPC .. B32B 5/022; B32B 5/26; B32B 7/06; B32B 27/12; B32B 37/153; A45D 40/26; A45D 44/002; D04H 1/728; D04H 1/4318
USPC ........................................ 442/382
See application file for complete search history.

(56) References Cited

U.S. PATENT DOCUMENTS

| | | | | |
|---|---|---|---|---|
| 2008/0069845 A1* | 3/2008 | Makihara | ............... | D04H 1/498 424/401 |
| 2009/0075354 A1* | 3/2009 | Reneker | ................... | C12N 1/04 435/182 |
| 2011/0259518 A1* | 10/2011 | Tojo | .......................... | B32B 7/06 156/308.6 |

FOREIGN PATENT DOCUMENTS

| | | |
|---|---|---|
| KR | 20110077792 | 7/2011 |
| KR | 20110080066 | 7/2011 |

(Continued)

OTHER PUBLICATIONS

International Search Report—PCT/KR2016/009076 dated Nov. 1, 2016.

*Primary Examiner* — Vincent Tatesure
(74) *Attorney, Agent, or Firm* — Cantor Colburn LLP

(57) ABSTRACT

Provided is a beauty care pack including: a support; and a membrane that is laminated on the support so as to be separated by moisture, formed by electrospinning a polymer material, a water-soluble polymer material and a functional material, and a dry type, in which the functional material is dissolved by moisture, to thereby enable an easy and convenient storage and package, and enable a convenient use since a dry sheet is attached to the face.

6 Claims, 3 Drawing Sheets

(51) Int. Cl.
  *B32B 27/12*  (2006.01)
  *A45D 44/00* (2006.01)
  *A45D 40/26* (2006.01)
  *B29C 65/56* (2006.01)
  *B29C 65/00* (2006.01)
  *B29D 99/00* (2010.01)
  *B32B 5/26* (2006.01)
  *B32B 37/15* (2006.01)
  *D04H 1/4318* (2012.01)
  *D04H 1/728* (2012.01)
  B32B 37/20 (2006.01)
  B32B 37/24 (2006.01)
  B29K 27/00 (2006.01)
  B29L 31/00 (2006.01)
  B32B 38/00 (2006.01)

(52) U.S. Cl.
  CPC ......... *B32B 37/153* (2013.01); *D04H 1/4318* (2013.01); *D04H 1/728* (2013.01); *B29K 2027/16* (2013.01); *B29K 2995/0062* (2013.01); *B29L 2031/718* (2013.01); *B32B 37/20* (2013.01); *B32B 37/24* (2013.01); *B32B 38/0004* (2013.01); *B32B 38/145* (2013.01); *B32B 2255/02* (2013.01); *B32B 2255/10* (2013.01); *B32B 2262/0238* (2013.01); *B32B 2270/00* (2013.01); *B32B 2305/20* (2013.01); *B32B 2307/402* (2013.01); *B32B 2307/7166* (2013.01); *B32B 2327/12* (2013.01); *B32B 2555/00* (2013.01); *D10B 2401/024* (2013.01); *D10B 2509/00* (2013.01)

(56) References Cited

FOREIGN PATENT DOCUMENTS

| KR | 101192628 | 10/2012 |
| KR | 20140052639 | 5/2014 |
| KR | 20150095374 | 8/2015 |

* cited by examiner

COSMETIC PACK AND MANUFACTURING METHOD THEREFOR

TECHNICAL FIELD

The present invention relates to a dry type beauty care pack (or a dry type cosmetic pack) in which a functional material is absorbed into a skin after being attached to the skin, and a method of manufacturing the beauty care pack.

BACKGROUND ART

Conventional general beauty care packs have been manufactured to contain essence including nutrients such as natural extracts, proteins, and vitamins on a woven fabric or a nonwoven fabric so as to have functions such as whitening, wrinkle reduction, moisture supply, relief from skin troubles, and allowance of skin elasticity.

However, since the conventional beauty care packs are manufactured on the basis of a woven fabric or a nonwoven fabric, sufficient adhesion is not achieved at the interface which is in contact with the skin, and thus effective ingredients cannot be sufficiently transferred to the deep part of the skin. In addition, an excessive amount of essence has been added to improve adhesive strength or power with respect to the skin.

Therefore, when a user makes an action actively with a conventional beauty care pack attached to the skin, the beauty care pack may fall or flow down due to the self-weight of the beauty care pack itself and the excessive essence may flow out, to thus result in uncomfortable and unpleasant feeling and also cause a loss of the essence. In addition, wearing a beauty care pack may often make it difficult for a wearer to take daily activities, and thus the wearer may have to lie down during the time of wearing the beauty care pack.

In order to overcome such disadvantages, hydrogel beauty care packs have recently been widely used. Since the hydrogel beauty care pack is excellent in the feeling of fit, a wearer who wears the hydrogel beauty care pack may perform daily activities, but the hydrogel beauty care pack is so thick to cause limited adhesion and to result in inconveniences of having to remove the hydrogel beauty care pack separately due to the flowing-down of the excessive essence or after the lapse of the wearing time.

Recently, nanofibers having a diameter of less than 1 μm have been actively studied using an electrospinning technique. These nanofibers are formed in a laminated structure having a three-dimensional pore structure at the same time of manufacture, and can provide a much larger skin contact area than conventional woven or nonwoven fabrics when used in the field of cosmetics. In addition, when manufacturing nanofibers, various functional materials are mixed with a spinning solution, and the spinning solution mixed with the various functional materials is spun, to then be manufactured in the form of nanofibers mounted with the functional materials.

As disclosed in Korean Patent Application Publication No. 10-2011-080066, a conventional mask pack has been proposed as a skin care pack, in which a double-layered nanofiber layer is formed on a nonwoven fabric, and the double-layered nanofiber layer is surface-treated with plasma. However, this technology includes the process of complexing the nanofiber layer on the nonwoven fabric and the secondary process such as the plasma treatment, to thereby increase the process cost.

In addition, a process such as lamination, thermal fusion, or ultrasonic bonding using a chemical adhesive or the like is required to make a composite of the nonwoven fabric and the nanofiber layer. When the adhesive or the like is not used, peeling between the nonwoven fabric and the nanofiber layer may happen due to the functional essence or moisture.

Furthermore, the nanofibers of the double-layered structure are spun in the form of a core/shell, in which the core portion is made of polyurethane or the like, and the shell portion contacting the skin is made of biodegradable polymers to minimize the trouble with the skin. However, in the case that 100% of the residual solvent is not removed due to the use of the toxic solvent, there is a problem of secondary contamination by the residual solvent.

Particularly, since most of the biodegradable polymers used in the conventional art are required to be hydrophilized through a plasma treatment process due to the hydrophobic properties of the biodegradable polymers, there may have problems of causing an increase in the process cost as well as causing deterioration of the functional material.

DISCLOSURE

Technical Problem

Accordingly, it is an object of the present invention to provide a beauty care pack which is manufactured in the form of a dry sheet by using a nanofiber web containing a functional material, to thus be easily and conveniently stored and packaged, and which is conveniently used since the dry sheet is attached on the face of a user, and a method of manufacturing the same.

It is another object of the present invention to provide a beauty care pack which includes a shape retaining portion to maintain moisturizing and hold the shape of the beauty care pack, and which includes a printed layer formed on the shape retaining portion to make a design beautiful, and a manufacturing method thereof.

It is still another object of the present invention to provide a beauty care pack which is transparent when a shape retaining portion contains a solvent and changes to a white color when the shape retaining portion is dried due to drying of the solvent, to thereby recognize the time of removing the beauty care pack, to thus enable a convenient use.

Technical Solution

In order to achieve the above object, according to an aspect of the present invention, there is provided a beauty care pack comprising: a support; and a membrane that is laminated on the support so as to be separated by moisture, formed by electrospinning a polymer material, a water-soluble polymer material and a functional material, and a dry type, in which the functional material is dissolved by moisture.

Preferably but not necessarily, the support may be formed of any one of a nonwoven fabric, a mesh, silicon, PET (polyethylene terephthalate, PE (polyethylene), PP (polypropylene) and PU (polyurethane).

Preferably but not necessarily, a release film may be attached to the membrane which protects the membrane and is separated from the membrane, at use.

Preferably but not necessarily, when the support and the membrane are pressed together, the fibers of the support and the fibers of the membrane are mutually intertwined and mutually laminated, and when water is added to the membrane and thus the functional material of the membrane melts, the support and the membrane may be separated from each other.

Preferably but not necessarily, the membrane may be formed into a nanofiber web shape by electrospinning a spinning solution containing a mixture of a polymer material, a water-soluble polymer material, a functional material, and a solvent to form nanofibers and by capturing the nanofibers.

Preferably but not necessarily, the membrane may include a shape retaining portion made of a polymer material, and a chemical liquid portion made of a water-soluble polymer material and a functional material.

Preferably but not necessarily, the shape retaining portion and the chemical liquid portion may be formed in a mixed shape or in a laminated shape.

Preferably but not necessarily, a printed layer may be formed on one surface of the shape retaining portion.

Preferably but not necessarily, the membrane is formed in a core shell structure so that the shape retaining portion may be disposed at the center of the membrane, and the chemical liquid portion may be disposed to wrap around the outer surface of the shape retaining portion.

Preferably but not necessarily, the water-soluble polymer materials may include one selected from polymer materials comprising polyvinyl pyrrolidone (PVP), polyvinyl alcohol (PVA), polyethylene oxide (PEO), carboxyl methyl cellulose (CMC), starch, polyacrylic acid (PAA), and hyaluronic acid, or a mixture of two or more thereof.

Preferably but not necessarily, the shape retaining portion may be transparent in a state containing a solvent, and may be changed to a color which can be visually confirmed when the solvent is dried.

According to another aspect of the present invention, there is provided a method of manufacturing a beauty care pack comprising the steps of forming a dry type membrane by electrospinning a spinning solution containing a mixture of a polymer material, a water-soluble polymer material, a functional material and a solvent on a release film, laminating the support on the membrane to then be compressed, and intertwining fibers of the support and fibers of the membrane to then be mutually laminated with each other, and cutting and shaping the membrane, the support, and the release film.

Advantageous Effects

As described above, a beauty care pack which is manufactured in the form of a dry sheet by using a nanofiber web containing a functional material, to thus be easily and conveniently stored and packaged, and is conveniently used since the dry sheet is attached on the face of a user.

Also, the shape retaining portion is provided to maintain moisturizing and hold the shape of the beauty care pack, and the printed layer can be formed on the shape retaining portion, so that the design can be made beautiful.

Further, when the shape retaining portion contains a solvent, the shape retaining portion is in a transparent form, and when the solvent is dried, the shape retaining portion changes to a white color, so that it is possible to grasp the time point of removing the beauty care pack, so as to be conveniently used.

BEST MODE

Figure 1:
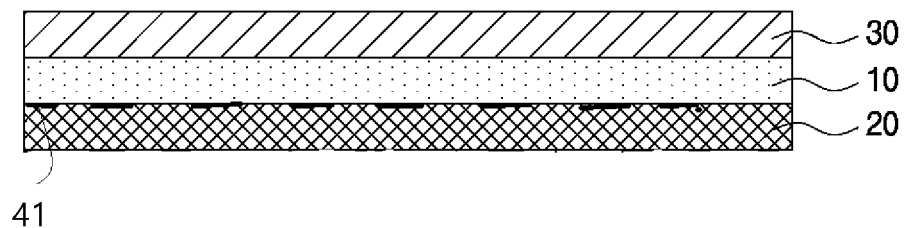
FIG. 1 is a cross-sectional view of a beauty care pack according to a first embodiment of the present invention.

Hereinafter, embodiments of the present invention will be described in detail with reference to the accompanying drawings. The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

Referring to FIG. 1, a beauty care pack according to an embodiment of the present invention includes a support 20, a membrane 10 laminated on the support 20 and attached to the face, and a release film 30 which is separated from the membrane 10 when used.

The support 20 serves to support the membrane 10, and may be formed by using a nonwoven fabric. In addition to the nonwoven fabric, the support 20 may be made of various materials capable of supporting the beauty care pack such as silicon, PET (polyethylene terephthalate, PE (polyethylene), PP (polypropylene) and PU (polyurethane).

The support 20 may be formed by using a mesh capable of supporting the entire beauty sheet while making the design beautiful. The mesh is formed by weaving silver yarn, fiber yarn, aluminum wire, or resin yarn.

The release film 30 is made of PET, PP, PE materials or release paper and has sufficient strength to support the membrane 10.

The membrane 10 is formed into a nanofiber web shape by electrospinning an electrospun polymer material, a water-soluble polymer material, and a functional material.

That is, the membrane 10 is formed into a nanofiber web shape by electrospinning a spinning solution obtained by mixing a water-soluble polymer material, a functional material and a solvent in an appropriate ratio to form nanofibers having a fiber diameter of less than 3 μm, and accumulating the nanofibers.

Figure 2:
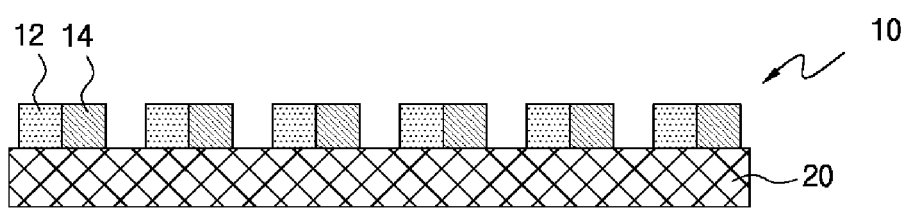
FIG. 2 is a cross-sectional view of a nanofiber according to an embodiment of the present invention.

As shown in FIG. 2, the membrane 10 includes a shape retaining portion 12 made of a polymer material and serving to retain the shape of the membrane 10 and absorb the essence of the membrane 10, and a chemical liquid portion 14 made of a water-soluble polymer material including a functional material and dissolved by a solvent.

When the support 20 and the membrane 10 are pressed together, the fibers of the support 20 and the fibers of the membrane 10 are intertwined with each other and laminated with each other, and when water is added to the membrane 10 and thus the functional material of the membrane 10 melts, the support 20 and the membrane 10 may be separated from each other.

Therefore, when the membrane 10 is attached to the face and then water is added to the membrane 10, the support 20 can be easily separated from the membrane 10, and only the membrane 10, which is in a transparent state, is attached to the face, to thereby enable a user to feel convenient for activity after being attached to the face.

Since the shape retaining portion 12 and the chemical liquid portion 14 are integrally formed by one time of electrospinning, the nanofibers may be formed in a shape in which the polymer material and the water-soluble polymer material are mixed or laminated.

In other words, as shown in FIG. 2, when looking at the cross-section of the nanofiber 40, the membrane 10 may include a shape retaining portion 12 made of a polymer material and a chemical liquid portion 14 made of a water-soluble polymer material, in a mixed shape. Otherwise, the membrane 10 may include the shape retaining portion 12 and the chemical liquid portion 14 in a laminated shape.

When the membrane 10 is attached to the face, the chemical liquid portion 14 is dissolved by the solvent, so that the functional material is absorbed into the skin and the water-soluble polymer material is absorbed into the support 20. Then, the shape retaining portion 12 retains the shape of the membrane 10 without being dissolved.

Here, since the shape retaining portion 12 is formed into a nanofiber web shape in which a polymer material is electrospun to accumulate nanofibers, diffused reflection disappears when the essence is absorbed, that is, in the state of containing a solvent, and thus the shape retaining portion 12 looks transparent. Meanwhile, when the essence does not exist, that is, when the solvent is in a dry state, the shape retaining portion 12 appears to be a white color or another color other than the white color. Therefore, it is possible to visually confirm that the functional material of the chemical liquid portion 14 is completely absorbed to the skin.

As described above, when the functional material of the chemical liquid portion 14 is completely absorbed by the skin and thus the solvent is dried, the shape retaining portion 12 changes to white so that the user can visually recognize the removal time of the beauty care pack.

Figure 3:
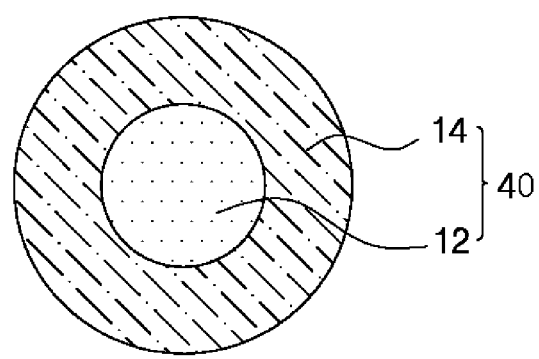
FIG. 3 is a cross-sectional view of a nanofiber according to another embodiment of the present invention.

In addition, as shown in FIG. 3, the nanofiber 40 may be formed in a shape in which a shape retaining portion 12 made of a polymer material is disposed at the center of the membrane 10, and a chemical liquid portion 14 made of a water-soluble polymer material wraps around an outer surface of the shape retaining portion 12.

Since the polymer material forming the shape retaining portion 12 and the water-soluble polymer material forming the chemical liquid portion 14 are different from each other, the membrane 10 may have a core shell structure in which the shape retaining portion 12 is disposed at the center of the membrane 10 and in which the chemical liquid portion 14 is arranged to wrap around the outer surface of the shape retaining portion 12, when the electrospinning is performed.

The polymer material forming the shape retaining portion 12 and the polymer material forming the chemical liquid portion 14 may have a core shell structure because they have different molecular weights or different melting points.

When the membrane 10 is attached to the face, the chemical liquid portion 14 wrapped around the outer surface of the shape retaining portion 12 is dissolved by the solvent so that the functional material is absorbed into the skin and the water-soluble polymer material is absorbed by the support 20. Then, the shape retaining portion 12 retains the shape of the membrane 10 without being dissolved.

Conventional beauty care packs should be separated from the face when a predetermined period of time has elapsed after being attached to the skin. However, the time taken for the beauty care pack to be absorbed by the skin is different depending on persons. Therefore, if the beauty care pack is removed at a predetermined time, the functional material contained in the beauty care pack may not be completely absorbed into the face, or the beauty care pack may remain attached to the face while the functional material is completely absorbed.

Since the shape retaining portion 12 of the present invention changes from transparent color to white color when the solvent is dried, the time for separating the beauty care pack from the face can be visually confirmed to thereby conveniently use the beauty care pack.

Any polymeric material can be used as long as the polymeric material forming the shape retaining portion 12 is an electrospinnable polymer material such as PVDF (polyvinylidene difluoride).

A printed layer 41 may be formed on one side of the shape retaining portion 12 to enhance the design.

The chemical liquid portion 14 is formed by mixing a water-soluble polymer, a functional material and a solvent at an appropriate ratio to prepare a spinning solution, then electrospinning the spinning solution to form nanofibers having a fiber diameter of less than 3 μm, and laminating the nanofibers so as to be formed into a nanofiber web shape.

When the chemical liquid portion 14 is adhered to the skin, all of the functional material is absorbed into the skin and the water-soluble polymer material is absorbed into the support 20.

As the solvent contained in the spinning solution for forming the shape retaining portion 12 and the chemical liquid portion 14, water or alcohol may be used. In addition to water and alcohol, an organic solvent may also be used.

The spinning method that may be applied for the present invention may employ any one of general electrospinning, air-electrospinning (AES), electrospray, electrobrown spinning, centrifugal electrospinning, and flash-electrospinning.

The water-soluble polymer material may employ synthetic polymers or natural polymers as a material that may be electrospun. The synthetic polymers or natural polymers may be used alone or in combination thereof, but any polymers that may be dissolved in water or alcohol to form nanofibers by electrospinning are not particularly limited.

Examples of such water-soluble polymer materials may include one selected from polymers including polyvinyl pyrrolidone (PVP), polyvinyl alcohol (PVA), polyethylene oxide (PEO), carboxyl methyl cellulose (CMC), starch, polyacrylic acid (PAA), and hyaluronic acid, or a mixture of two or more thereof.

One of ingredients (such as albutine, niacinamide, and ascorbyl glucoside) that help skin whitening, ingredients (such as retinol and adenosine) that help to improve skin wrinkles, ingredients (such as titanium dioxide) that help to block ultraviolet rays, ingredients (such as snail mucus filtrate, acetyl hexapeptide, red ginseng collagen, aquaceramide, regenerating peptide, and galactomirase fermentation broth) that help moisturizing and skin elasticity, or a mixture of two or more thereof, may be used as the functional material.

In addition, the functional material may comprise one or a mixture of two or more selected from water-soluble collagen, vegetable platinum, tocopherol, xylitol and plant extract.

The crosslinking agent or co-crosslinking agent may be formed of one selected from para-toluene sulfonic acid (TSA), polyurea-co-formaldehyde, tri-methylpropane trimethacrylate (TMPTMA), divinylbenzene (DVB), N-(1-hydroxy-2,2-dimethoxyethyl) acrylamide, N,N-methylenebisacrylamide, ethylene glycol diacrylate, di(ethylene glycol) diacrylate, boric acid, and glutaraldehyde, or a mixture of two or more thereof.

Figure 4:
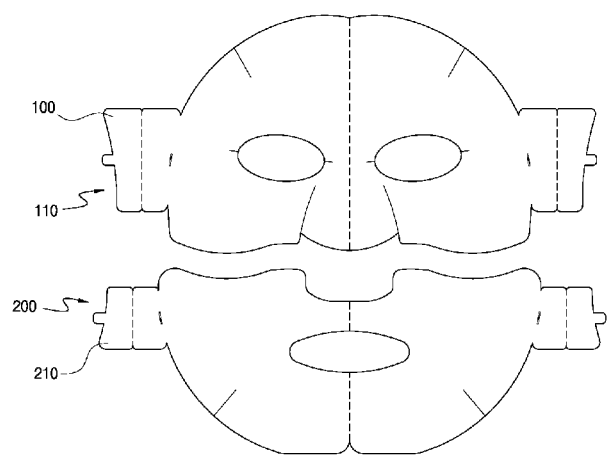
FIG. 4 is a plan view of a beauty care pack according to an embodiment of the present invention.
Figure 5:
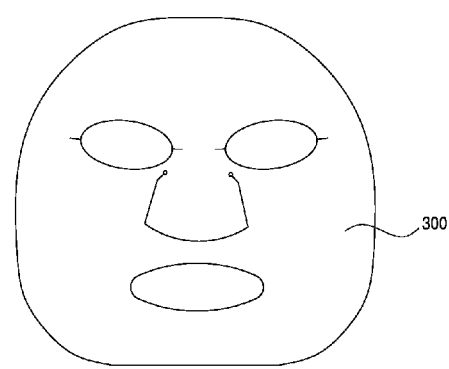
FIG. 5 is a plan view of a beauty care pack according to another embodiment of the present invention.

As shown in FIG. 4, the beauty care pack according to an embodiment of the present invention may be formed in a shape including an upper beauty care pack 100 attached to the upper part of the face, a lower beauty care pack 200 attached to the lower part of the face, or as shown in FIG. 5, the beauty care pack according to another embodiment of the present invention may be formed in a shape of a single beauty care pack 300 that surrounds the entire face.

In the beauty care pack according to an embodiment of the present invention, the separating knob 110 is formed to separate the release film 30 and the membrane 10 from each other while holding the separating knob 110, to thereby enable the separating operation to be easy and prevent the membrane 10 from being damaged or contaminated.

The beauty care pack according to an embodiment of the present invention may have a form attached to a body part such as a neck or a hand, in addition to a form of a mask pack attached to a face.

The manufacturing process of the beauty care pack will be described below.

Figure 6:
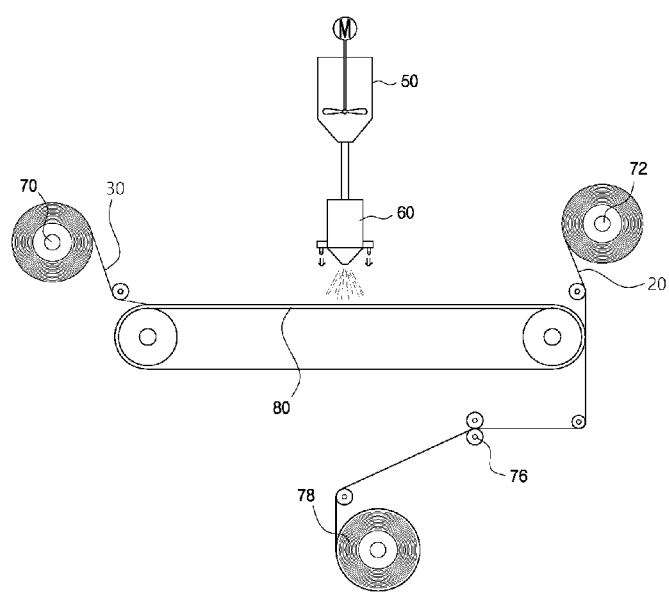
FIG. 6 is a configuration diagram of a beauty care pack manufacturing apparatus according to an embodiment of the present invention.

FIG. 6 is a configuration diagram of a beauty care pack manufacturing apparatus according to an embodiment of the present invention.

The beauty pack manufacturing apparatus according to an embodiment of the present invention comprises a storage tank 50 storing a spinning solution in which a polymer material, a water-soluble polymer material, a functional material, and a solvent are mixed together, a spinning nozzle 60 connected to a high-voltage generator and connected to the storage tank 50 to form nanofibers, and a collector 80 formed below the spinning nozzle 60 and accumulating the nanofibers formed in the spinning nozzle 60 to form a nanofiber web.

A high voltage electrostatic force of 90 to 120 Kv is applied between the collector 80 and the spinning nozzle 60 to enable the spinning nozzle 60 to spin the nanofibers and to enable the collector 80 to accumulate the nanofibers to form a membrane 10 of a nanofiber web form.

A release film roll 70 wound with a release film 30 is provided in front of the collector 80 and a support roll 72 wound with the support 20 is provided at the rear of the collector 80.

Hereinafter, a process of manufacturing a beauty care pack using the beauty care sheet manufacturing apparatus constituted as described above will be described.

First, when the collector 80 is driven, the release film 30 wound around the release film roll 70 is supplied to the upper surface of the collector 80.

By applying a high voltage electrostatic force between the collector 80 and the spinning nozzle 60, the spinning solution is made into nanofibers in the spinning nozzle 60 and spun on the release film 30. Then, the nanofibers are accumulated on the release film 30 to form a membrane 10 in the form of a nanofiber web.

Here, the nanofiber 40 includes a shape retaining portion 12 made of a polymer material and not soluble in a solvent, and a chemical liquid portion 14 made of a water-soluble polymer material containing a functional material and dissolved in the solvent, which are spun in a mixed state.

Then, the shape retaining portion 12 and the chemical liquid portion 14 may be formed in a mixed shape, in a laminated shape, or in a shape in which the shape retaining portion 12 is disposed at the center of the membrane, and the chemical liquid portion 14 is formed of a water-soluble polymer material to wrap around the outer surface of the shape retaining portion 12.

Then, the support 20 wound around the support roll 72 and the membrane 10 are laminated with each other. Here, when the support 20 and the membrane 10 are pressed together, the fibers of the support 20 and the fibers of the membrane 10 are intertwined with each other and laminated with each other. The porous support 20 and the membrane 10 which have been laminated with each other are separated from each other when the functional material of the membrane 10 is dissolved by the introduction of water.

A printed layer 41 may be formed on one side of the shape retaining portion 12 to enhance the design.

As described above, the beauty care pack, which has completed the manufacturing process, is formed in the form of being attached to a face or a body part by performing a cutting process.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The beauty care pack according to an embodiment of the present invention is formed as a dry type, and when moisture is added to the face after being attached to the face, the functional material is melted and absorbed by the skin, to thereby enable an easy and convenient storage and package, and enable an open field activity after being attached to the face.

What is claimed is:

1. A beauty care pack comprising:
   a support; and
   a membrane laminated on one surface of the support, the membrane being formed of accumulated electrospun fibers, each of the electrospun fibers being made of a mixture of a polymer material, a water-soluble polymer material and a functional material for skin health, the polymer material being a water-insoluble polymer material and serving to retain a shape of the membrane,
   wherein, when a user applies water to the membrane, the water-soluble polymer material is dissolved by the water so as to release the functional material towards a face of the user, and the water-insoluble polymer material sustains the shape of the membrane without being dissolved by the water, thereby being able to whiten a face skin, improve a face wrinkle, block ultraviolet rays, moisturize a face skin, or enhance skin elasticity.

2. The beauty care pack of claim 1, wherein the support is formed of any one selected from the group consisting of a nonwoven fabric, a mesh, silicon, PET (polyethylene terephthalate), PE (polyethylene), PP (polypropylene) and PU (polyurethane).

3. The beauty care pack of claim 1, further comprising: a release film attached to the other surface of the membrane, the release film being configured to protect the membrane and be separated from the membrane when in use of the beauty care pack.

4. The beauty care pack of claim 1, wherein the electrospun fibers includes electrospun nanofibers.

5. The beauty care pack of claim 1, further comprising: a printed layer formed between the support and the membrane.

6. The beauty care pack of claim 1, wherein the water-soluble polymer materials comprises: one selected from the group consisting of polyvinyl pyrrolidone (PVP), polyvinyl alcohol (PVA), polyethylene oxide (PEO), carboxyl methyl cellulose (CMC), starch, polyacrylic acid (PAA), hyaluronic acid, and a mixture of two or more thereof.

\* \* \* \* \*